United States Patent Office 2,957,905
Patented Oct. 25, 1960

2,957,905

ORGANO-PHOSPHORUS COMPOUNDS

Van R. Gaertner, Dayton, Ohio, assignor to Monsanto Chemical Company, St. Louis, Mo., a corporation of Missouri No Drawing. Filed Aug. 11, 1958, Ser. No. 754,151

18 Claims. (Cl. 260—461)

This invention relates to the reaction of alkanesultones with esters of organo-phosphorus compounds in which the phosphorus atom is trivalent and to the products thereof. The present application is a continuation-in-part of my copending applications Serial No. 542,499 filed October 24, 1955, now abandoned and Serial No. 601,104 filed July 31, 1956, now abandoned.

When tertiary phosphite esters are reacted with organic sulfonyl halides, it is reported (U.S. 2,690,450) that a phosphonothioate is formed. On the other hand, the literature indicates that treatment of a tertiary phosphite ester with an organic sulfonate ester gives a phosphonate which is free of sulfur (J. Amer. Chem. Soc. 1954, 76, 4172).

In accordance with the present invention, sultones are reacted with organo-phosphorus compounds in which at least one residual valence is satisfied by acidic derivative function. The organo-phosphorus compounds which are useful in the present process include phosphonous, phosphinous and phosphonic acid compounds. Particularly useful in the process of the invention are the phosphonite, phosphinite and phosphite esters or the thio analogs thereof.

I have now discovered that new and valuable compounds containing phosphonic, phosphonous or phosphinous and sulfonic acid groups are obtained when an alkanesulton eis reacted with a phosphonite, phosphinite or phosphite ester. The primary reaction product is an ester; but by pyrolysis or other suitable means, e.g. hydrolysis, the ester can be converted to the di- or mono-esters or the free acid. The over all reaction can be represented by the following equation:

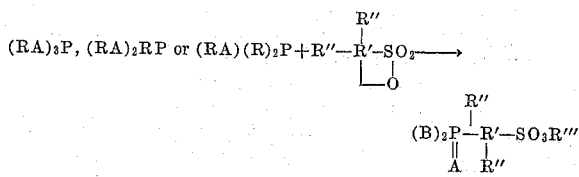

Wherein R is an organic radical free of non-benzenoid unsaturation containing from 1 to 12 carbon atoms, R' is a saturated hydrocarbon radical of from 3 to 7 carbon atoms, R'' is selected from the class consisting of hydrogen and hydrocarbon radicals free of non-benzenoid unsaturation and containing from 1 to 12 carbon atoms, R''' is selected from the class consisting of hydrogen and R, A is a chalcogen element selected from the class consisting of oxygen and sulfur, and B is a radical selected from the class consisting of R and AR'''. By non-benzenoid unsaturation is here meant olefinic and acetylenic unsaturation which types of unsaturation are known in the chemical art to differ in reactivity from aromatic, i.e., benzenoid unsaturation.

The sultones employed in the preparation of the present compounds are readily available compounds which may be prepared, e.g., by sulfochlorination of an organic halide, hydrolysis of the halogenated organic sulfonyl chloride thereby formed, and ring-closure of the hydrolysis product, with evolution of hydrogen halide, yielding the sultone. Whereas sultones are preferably named as derivatives of the corresponding hydroxy sulfonic acid, i.e.,

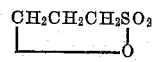

Sultone of 3-hydroxy-1-propane sulfonic acid in an alternative system, they may be named simply as alkanesultones, i.e., propanesultone, butanesultone, etc. For example, by butanesultone is meant any one or more of the following isomers:

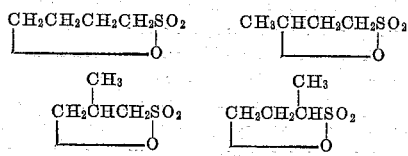

In a preferred embodiment of the present reaction, sultones of the formula

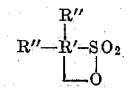

are used, where R' is a hydrocarbon radical containing from 3 to 7 carbon atoms, and R'' is selected from the class consisting of hydrogen and hydrocarbon radicals free of aliphatic unsaturation and containing from 1 to 12 carbon atoms. These include, e.g., propanesultone, butanesultone, isooctanesultone, tert - dodecanesultone, n-hexadecanesultone, kerosenesultone, etc. As examples of specific useful sultones may be listed, e.g., alkanesultones such as the sultone of 3-hydroxy-1-propanesulfonic acid, the sultone of 4-hydroxy-2-methyl-2-butantesulfonic acid, the sultone of 5-hydroxy-1-pentantesulfonic acid, acid, the sultone of 5-hydroxy-1-pentanesulfonic acid, the sultone of 7,7-di-tert-dodecyl-4-hydroxy-1-heptanesulfonic acid, etc., and arene-, aralkane-, and cycloalkanesultones such as the sultone of 3-hydroxy-3-phenyl-1-propanesulfonic acid, the sultone of 4-hydroxy-2,4-diphenyl-1-butanesulfonic acid, etc.

Phosphorus compounds useful in the process of the invention include phosphonite, phosphinite and phosphite esters, or their thio analogs. Particularly preferred are the alkyl and chloroalkyl esters of phosphonous, phosphinous and phosphorus acids. The organic radical attached directly to phosphorus by a carbon-phosphorous bond and the ester radical in these esters can be a hydrocarbon radical or a substituted hydrocarbon radical wherein the substituents do not interfere in the course of the present reaction with sultones; but it is preferred that at least one ester-forming radical is an alkyl or aralkyl groups in which the carbon atom attached to the oxygen or sulfur atom of the ester group is aliphatic, e.g., the triaryl phosphites undergo the present reaction, but require substantially elevated temperatures to produce formation of the desired tertiary esters of phosphonoalkanesulfonic acid compounds. Examples of such non-interfering substituents are cyano, carbalkoxy and alkoxy radicals, and nuclearly substituted halogen atoms on aryl radicals. The tertiary phosphite esters useful in the present reaction can be prepared, e.g. by the reaction of the corresponding alcohol or mercaptan with phosphorous trichloride in the presence of a tertiary base. Phosphonous, phosphinous and phosphite acid esters are well known compounds, the preparation of which is further described for example in a monograph by G. M. Kosolapoff entitled "Organo-phosphorus Compounds" (Wiley, New York, 1950).

Examples of presently useful phosphonite esters wherein the organic radicals bonded directly to the phosphorous atom are hydrocarbon radicals, and which may be reacted with sultone in accordance with the present invention are, for example, alkyl-phosphonite esters such as dimethyl ethylphosphonite, diethyl ethylphosphonite, dipropyl ethylphosphonite, diisopropyl ethylphosphonite, dibutyl ethylphosphonite, dihexyl ethylphosphonite, di-n-octyl ethylphosphonite, di-2-ethylhexyl ethylphosphonite, methyl ethyl ethylphosphonite, phenyl methyl ethylphosphonite, diethyl propylphosphonite, diethyl isopropylphosphonite, diisopropyl isopropylphosphonite, diethyl isobutylphosphonite, diisobutyl isobutylphosphonite, diethyl isoamylphosphonite, diisopropyl isoamylphosphonite, dioctyl heptylphosphonite, dioctyl n-octylphosphonite, diethyl dodecylphosphonite, di-n-octyl decylphosphonite, butyl p-isoamylphenyl ethylphosphonite, etc.; as well as esters of cycloalkyl phosphonous acids, such as diethyl cyclohexylphosphonite; esters of aralkylphosphonous acids, such as diethyl benzylphosphonite, diethyl 3-phenylhexylphosphonite, dibutyl benzylphosphonite, etc.; esters of arylphosphonous acids, such as diethyl phenylphosphonite, diisobutyl phenylphosphonite, diethyl 4-biphenylylphosphonite, dibutyl phenylphosphonite, diisoamyl phenylphosphonite, diisopropyl p-tolylphosphonite, dibutyl p-tolylphosphonite, etc.; and esters of thiophosphonous acids, such as diethyl ethylphosphonothioate, dimethyl ethylphosphonodithioate, etc.

Examples of phosphonite esters in which non-interfering substituents are present on the organic radical attached directly to the phosphorus atom by a carbon-to-phosphorus bond are e.g., diethyl 4-cyanobutylphosphonite, diethyl 2-ethoxyethylphosphonite, diethyl p-chlorophenylphosphonite, diethyl p-bromophenylphosphonite, diethyl p-methoxyphenylphosphonite, dibutyl p-methoxyphenylphosphonite, diethyl p-ethoxyphenylphosphonite, diethyl 3-chloro-4-methylphenylphosphonite, ethyl 2-(diisopropoxyphosphino)-p-toluate, etc.

Phosphinite esters useful in the present reaction wherein the organic radicals bonded directly to the phosphorus atoms are hydrocarbon radicals are, for example, ethyl diethylphosphinite, ethyl dipropylphosphinite, ethyl dibutylphosphinite, methyl methylethylphosphinite, ethyl diphenylphosphinite, isopropyl diphenylphosphinite, dodecyl diphenylphosphinite, ethyl phenyltolylphosphinite, ethyl ethyl(o,p-di-n-propylphenyl)phosphinite, octyl dicyclohexylphosphinite, amyl dibenzylphosphinite, ethyl di-o-tolylphosphinite, ethyl phenyl-p-tolylphosphinite, ethyl di-p-tolylphosphinite, isoamyl di(p-isoamylphenyl)phosphinite, etc. Also useful in the present process are phosphinite esters wherein the organic radical bonded directly to the phosphorus atom by a carbon atom is a substituted hydrocarbon radical wherein the substituent is one which does not interfere in the present reaction, such as ethyl di(o-chlorophenyl)phosphinite, ethyl di-(p-chlorophenyl)-phosphinite, ethyl di(p-ethoxyphenyl)-phosphinite, etc., and esters of thiophosphinous acids, such as ethyl dimethylphosphinothioate, ethyl diethylphosphinothioate, etc.

Particularly useful in the present reaction are the tertiary alkyl esters of phosphorous acid. One class of such alkyl phosphites includes the trialkyl phosphites. As examples of trialkyl phosphites in which all three ester groups are identical may be listed trimethyl phosphite, triethyl phosphite, tripropyl phosphite, triisopropyl phosphite, tri-n-butyl phosphite, tri-tert-butyl phosphite, triisoamyl phosphite, trihexyl phosphite, tris(2-ethylhexyl) phosphite, tri-n-octyl phosphite, tri-tert-decyl phosphite, triisododecyl phosphite, tris(2-butyloctyl) phosphite, trihexadecyl phosphite, tri-sec-butyl phosphite, etc. Examples of trialkyl phosphites in which different alkyl ester groups are present are diethyl methyl phosphite, dipropyl butyl phosphite, di-n-butyl propyl phosphite, ethyl 2-butyloctyl hexyl phosphite, diisopropyl hexadecyl phosphite, etc.

Also useful in the present process are tertiary phosphite esters of the above formula which contain alkenyl groups, i.e., 1-methyl-3-pentenyl diethyl phosphite, 3-vinylisodecyl diethyl phosphite, bis(4-vinylhexyl) isopropyl phosphite, tris(4-butyl-5-dodecenyl) phosphite, etc.

Another class of tertiary phosphite esters which undergo the present reaction with alkanesultones comprises the aryl phosphite esters. These include, e.g., triaryl esters such as triphenyl phosphite, tri-p-tolyl phosphite, etc.; particularly preferred in the present process are the diaryl alkyl and dialkyl aryl phosphite esters such as diphenyl ethyl phosphite, diethyl phenyl phosphite, di-o-tolyl butyl phosphite, bis(2-ethylhexyl) phenyl phosphite, di-isohexyl 1-naphthyl phosphite, dinonyl phenyl phosphite, bis(2-butyldecyl) phenyl phosphite, diethyl p-tolyl phosphite, etc.

Useful in the process of the present invention are also the classes of aralkyl and cycloalkyl phosphite tertiary esters. As examples of aralkyl phosphite esters may be listed, e.g., triphenethyl phosphite, tris(3-phenylbutyl) phosphite, 3-phenylpropyl diethyl phosphite, etc. Cycloalkyl esters of phosphorous acid useful in the present process are, e.g., tricyclohexyl phosphite, cyclohexyl diethyl phosphite, cyclopentyl hexadecyl butyl phosphite, etc.

Also included in the scope of the present invention are the phosphonoalkanesulfonic acid compounds prepared from tertiary phosphite esters such as those described above in which the ester radical includes substituents which do not interfere with the course of the reaction with sultones. Such substituents include, for example, halogen atoms, alkoxy radicals, carbalkoxy radicals, and cyano radicals. The class of halogenated tertiary phosphite esters useful in the preparation of the present compounds includes, e.g., tris(2-chloroethyl) phosphite, tris(2,2,2-trichloroethyl) phosphite, 2-chloroethyl diethyl phosphite, 2-chloroethyl di-n-butyl phosphite, p-chlorophenyl dibutyl phosphite, etc. Examples of the class of alkoxy-substituted tertiary phosphite esters which undergo the present reaction are tris(methoxymethyl) phosphite, tris(2-ethoxyethyl) phosphite, tris-(4-ethoxybutyl) phosphite, 2-(2-methoxyethoxy)ethyl dimethyl phosphite, 2-butoxyisopropyl diisopropyl phosphite, tris(2-butoxyethyl) phosphite, tris[2-(methoxymethoxy)ethyl] phosphite, o-methoxyphenyl diethyl phosphite, p-methoxyphenethyl bis(2-ethylhexyl) phosphite, etc. Carbalkoxyalkyl tertiary phosphite esters useful in preparing the present compounds include, e.g., tris(2-carbethoxyethyl) phosphite, tris(carboisobutoxymethyl) phosphite, 1-carbethoxyethyl diethyl phosphite, etc. Cyanoalkyl phosphite esters useful in the process of this invention include, e.g., tris(3-cyano-1-propyl) phosphite, tris(2-cyanoethyl) phosphite, etc.

Another class of phosphite tertiary esters contemplated for use in the present process includes the cyclic phosphite esters. For example, glycol alkyl tertiary phosphite esters such as ethylene methyl phosphite, ethyl propylene phosphite, 2-chloroethyl propylene phosphite, butyl 2-methylpropylene phosphite, ethyl methoxymethylethylene phosphite, ethyl 1-methylpropylene phosphite, chloromethylethylene butyl phosphite, butylene methyl phosphite, etc., may be reacted with sultones as described above. Also useful in the present preparation are cyclic esters of phosphorous acid with a monohydric alkyl alcohol and a dihydric aryl alcohol, i.e., methyl o-phenylene phosphite, butyl o-phenylene phosphite, isobutyl o-phenylene phosphite, etc.

A further class of tertiary phosphite esters useful in the reaction of the invention are the thiophosphites in which one, two or three of the oxygen atoms of the ester groups have been replaced by a sulfur atom, i.e., phosphorothious, phosphorodithious and phosphorotrithious acids. Particularly preferred in the present process are the mono- and dithiophosphite tertiary esters, i.e., triethyl phosphorothioite, triethyl phosphorodithioite, tripropyl phosphorothioite, diethyl propyl phosphorodithioite, etc.

In accordance with the present invention, phosphonite and phosphinite esters are reacted with sultones to give phosphinylalkanesulfonates in which at least two organic radicals are attached directly to the phosphorus atom of the phosphinylalkanesulfonate compound by a carbon-to-phosphorus bond. Exemplary products which may be prepared by the process of the invention utilizing alkyl hydrocarbon-phosphonite esters are:

methyl 3-(ethylmethoxyphosphinyl)-1-propanesulfonate,
ethyl 3-(ethylethoxyphosphinyl)-1-propanesulfonate,
isopropyl 4-(ethylethoxyphosphinyl)-1-butanesulfonate,
hexyl 3-(hexylhexoxyphosphinyl)-1-propanesulfonate,
octyl 3-(ethylethoxyphosphinyl)-1-propanesulfonate,
2-ethylhexyl 3-(ethyl(2-ethylhexoxy)phosphinyl)-1-propanesulfonate,
dodecyl 3-ethylethoxyphosphinyl)-1-propanesulfonate,
ethyl 3-(propylethoxyphosphinyl)-1-propanesulfonate,
ethyl 4-(isopropylethoxyphosphinyl)-1-butanesulfonate,
ethyl 4-(isoamylethoxyphosphinyl)-2,3-dimethyl-1-heptanesulfonate,
ethyl 5-(n-octylethoxyphosphinyl)-5,5-diamyl-2-dodecanesulfonate,
butyl 4-(butoxypropylphosphinyl)-2-pentanesulfonate,
isobutyl 3-(isobutylisobutoxyphosphinyl)-1-propanesulfonate,
2-ethylhexyl 3-(ethyl(2-ethylhexoxy)-phosphinyl)-1-propanesulfonate,
methyl 4-(ethylnonoxyphosphinyl)-1-butanesulfonate,
ethyl 3-(isoamyldodecoxyphosphinyl)-1-propanesulfonate,
ethyl 3-(phenylethoxyphosphinyl)-1-propanesulfonate,
t-butyl 4-(phenyl-t-butoxyphosphinyl)-2-ethyl-1-butanesulfonate,
ethyl 4-(p-tolylethoxyphosphinyl)-2-pentanesulfonate,
ethyl 3-[(diisopropylphenyl)ethoxyphosphinyl)]-1-propanesulfonate,
propyl 4-(cyclohexylpropoxyphosphinyl)-2,3-dimethyl-1-heptanesulfonate, etc.

Examples of products of the reaction of sultones with alkyl esters of phosphinites in which the organic radical attached to the phosphorus atom by a carbon-to-phosphorus bond contains a non-interfering substituent are:

ethyl 3-(p-chlorophenylethoxyphosphinyl)-1-propanesulfonate,
ethyl 4-(p-chlorophenylethoxyphosphinyl)-1-butanesulfonate,
ethyl 3-(p-bromophenylethoxyphosphinyl)-1-propanesulfonate,
ethyl 3-[(p-methoxyphenyl)-propoxyphosphinyl]-1-propanesulfonate,
ethyl 3-[ethoxy(p-ethoxyphenyl)phosphinyl]-1-propanesulfonate,
ethyl 4-[ethoxy(p-ethoxyphenyl)phosphinyl]-2-pentanesulfonate, etc.;

and thio analogs such as ethyl 3-[ethyl(ethylthio)phosphinyl]-1-propanesulfonate,
ethyl 3-[ethyl(ethoxy)thionophosphinyl]-1-propanesulfonate,
ethyl 3-[ethyl(ethylthio)thionophosphinyl]-1-propanesulfonate, etc.

By the reaction of presently useful phosphinites with sultones are obtained the novel compounds of the above formula wherein the organic radicals are bonded to the phosphorus atom directly by carbon atoms. Examples of such products formed in accordance with this invention are:

ethyl 3-(ethylmethylphosphinyl)-1-propanesulfonate,
ethyl 3-(diethylphosphinyl)-1-propanesulfonate,
ethyl 3-(di-n-propylphosphinyl)-1-propanesulfonate,
ethyl 4-(dibutylphosphinyl)-1-butanesulfonate,
ethyl 3-(dicyclohexylphosphinyl)-1-propanesulfonate,
ethyl 4-(methylphenylphosphinyl)-2-pentanesulfonate,
ethyl 3-(ethylphenylphosphinyl)-1-propanesulfonate,
ethyl 3-(diphenylphosphinyl)-1-propanesulfonate,
ethyl 4-(diphenylphosphinyl)-2-ethyl-1-butanesulfonate,
ethyl 3-(di-o-tolylphosphinyl)-1-propanesulfonate,
ethyl 4-(di-o-tolylphosphinyl)-1-t-dodecanesulfonate,
isopropyl 3(diisopropylphosphinyl)-1-propanesulfonate,
isopropyl 3-(diamylphosphinyl)-1-butanesulfonate,
isopropyl 5-[di-(2-ethylhexyl)phosphinyl]-2-dodecanesulfonate,
isopropyl 3-(isopropylphenylphosphinyl)-1-propanesulfonate,
n-propyl 3-(diethylphosphinyl)-1-propanesulfonate,
isobutyl 3-(dibenzylphosphinyl)-2-phenyl-1-propanesulfonate,
dodecyl 4-(diethylphosphinyl)-3-ethyl-1-hexadecanesulfonate,
dodecyl 3-(di-4-biphenylylphosphinyl)-1-propanesulfonate,
dodecyl 3-(didodecylphosphinyl)-2-dodecanesulfonate,
ethyl 3-(di-o-chlorophenylphosphinyl)-1-propanesulfonate,
ethyl 3-(di-p-chlorophenylphosphinyl)-1-propanesulfonate,
ethyl 4-(di-o-chlorophenylphosphinyl)-1-butanesulfonate,
ethyl 3[di-(p-methoxyphenyl)phosphinyl]-1-propanesulfonate, etc.;

and thio analogs such as ethyl 3-(diethylthionophosphinyl)-1-propanesulfonate, etc.

The primary reaction products of alkanesultones and tertiary phosphite esters are, as shown above, tertiary esters of phosphonoalkanesulfonic acids, of the formula

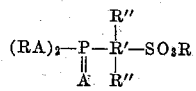

where R, R', R" and A are as defined above. The reaction products of trialkyl phosphites and alkanesultones of the above formula are named as alkyl (dialkoxyphosphono)alkanesulfonates. As examples of the compounds which may be made by the present process with such reactants may be listed, e.g.:

ethyl 3-(diethoxyphosphono)-1-propanesulfonate,
isopropyl 3-(diisopropoxyphosphono)-1-propanesulfonate,
n-butyl 3-(di-n-butoxyphosphono)-1-propanesulfonate,
tert-amyl 4-(di-tert-amoxyphosphono)-1-butanesulfonate,
2-ethylhexyl 3-[bis(2-ethylhexoxy)phosphono]-1-propanesulfonate,
2-butyloctyl 3-[bis(2-butyloctoxy)phosphono]-1-propanesulfonate,
n-hexyl 5-(dihexoxyphosphono)-1-pentanesulfonate,
ethyl 4-(diethoxyphosphono)-2-methyl-1-butanesulfonate,
propyl 4-(dipropoxyphosphono)-2-butanesulfonate,
isobutyl 3-(diisobutoxyphosphono)-1-phenyl-1-propanesulfonate,
tert-dodecyl 4-(di-tert-dodecoxyphosphono)-1-tert-dodecanesulfonate,
ethyl 3-(diisopropoxyphosphono)-1-propanesulfonate,
n-butyl 3-(O-n-butoxy-O'-hexoxyphosphono)-1-propanesulfonate,
isooctyl 4-(diisoctoxyphosphono)-1-octanesulfonate,
methyl 5-(O-ethoxy-O'-propoxyphosphono)-1-pentanesulfonate, etc.

Reaction of alkanesultones with trialkyl phosphites having substituents on the alkyl groups gives, e.g.:

2-chloroethyl 3-[bis(2-chloroethoxy)phosphono]-1-propanesulfonate,
2-bromoethyl 4-[bis(2-bromoethoxy)phosphono]-1-butanesulfonate,
2-chlorobutyl 4-[bis(2-chlorobutoxy)phosphono]-2-phenyl-1-butanesulfonate, 2-cyanoethyl 3-[bis(2-cyanoethoxy)phosphono]-1-propanesulfonate,
1-cyanoethyl 4-[bis(1-cyanoethoxy)phosphono]-2-methyl-1-butanesulfonate,
2-butoxyethyl 3-[bis(2-butoxyethoxy)phosphono]-1-propanesulfonate,
3-(methoxymethoxy)propyl 3-(bis[3-(methoxymethoxy)propxy]phosphono)-1-propanesulfonate,
2-(2-ethoxyethoxy)ethyl 3-(diethoxyphosphono)-1-decanesulfonate,
3-(3-methoxypropoxy)propyl 4-(bis[3-(3-methoxypropoxy)propoxy]phosphono)-1-butanesulfonate,
2-carbobutoxyethyl 3-[bis(2-carbobutoxyethoxy)phosphono]-1-propanesulfonate,
2-(3-chloropropoxy)ethyl 5-[bis(2-chloroethoxy)phosphono]-1-pentanesulfonate, etc.

Cyclic phosphite esters reacted with alkanesultones in accordance with the present invention give, e.g.:

methyl 3-(1,3-propylenedioxyphosphono)-1-propanesulfonate,
chloroethyl 3-(2-methyl-1,3-propylenedioxyphosphono)-1-butanesulfonate,
chloroethyl 4-(1,2-diethyl-1,2-ethylenedioxyphosphono)-2-phenyl-1-butanesulfonate, etc.

Aryl alkyl phosphite esters reacted with alkanesultones give, e.g.:

ethyl 3-(O-ethoxy-O'-phenoxyphosphono)-1-propanesulfonate,
2-ethylhexyl 4-[O-(2-ethylhexoxy)-O'-o-toloxyphosphono]-1-butanesulfonate,
2-chloroethyl 3-(diphenoxyphosphono)-4,4-diphenyl-1-pentanesulfonate,
n-butyl 4-[O-(2-butyloctoxy)-O'-phenoxyphosphono]-1-butanesulfonate, etc.

Products of reaction of phosphorothioite esters with alkane sultones are, e.g.:

ethyl 3-(diethoxythionophosphono)-1-propanesulfonate,
2-chlorobutyl 3-(diethoxythionophosphono)-1-propanesulfonate,
2-ethoxyethyl 4-[bis(2-ethoxyethoxy)thionophosphono]-1-butanesulfonate,
2-ethylhexyl 3-[O,S-bis(2-ethylhexoxy)-thiolothionophosphono]-1-octanesulfonate, etc.

As mentioned above, pyrolysis of the tertiary esters of phosphonoalkanesulfonic acids produced in accordance with the present invention yields the secondary and primary esters of these acids, and if desired, the free acids themselves may also be produced by pyrolysis, hydrolysis, etc. Pyrolysis of the tertiary esters of the present phosphonoalkanesulfonic acids to give the secondary esters of these acids may be represented schematically by the following equation, for example:

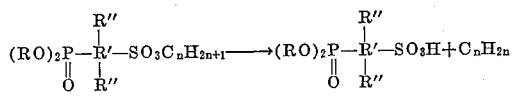

where R, R' and R'' are as herein defined above. The thiophosphonoalkanesulfonate esters are equivalent to the phosphonoalkanesulfonate esters for the purpose of this invention. In the above equation also, the ester group pyrolyzed off is shown as alkyl hydrocarbon for the sake of convenience, to illustrate the formation of an olefinic compound in this reaction; as discussed hereinabove, ester-forming groups bearing substituents such as alkoxy groups, etc., are equally included in the concept of this invention. It will be noted that the ester-forming group on the sulfonic acid group is shown as being cleaved in the above equation. The phosphonic acid ester groups may equally be converted to free acid groups by the processes of this invention, and the non-tertiary esters of phosphonoalkanesulfonic acid compounds covered by the concept of this invention include, e.g., alkyl (alkoxyphosphono)alkanesulfonates,
alkyl phosphonoalkanesulfonates,
(dialkoxyphosphono)alkanesulfonic acids,
(alkoxyphosphono)alkanesulfonic acids, and
phosphonoalkanesulfonic acids.

In like manner from the corresponding phosphinylalkanesulfonate compounds are formed, e.g., alkyl (alkylphosphinyl)alkanesulfonates,
(alkylphosphinyl)alkanesulfonic acids,
(alkylalkoxyphosphinyl)alkanesulfonic acids, and
(dialkylphosphinyl)alkanesulfonic acids.

As examples of secondary esters of phosphonoalkanesulfonic acid compounds provided by the present invention may be mentioned:

methyl 3-(methoxyphosphono)-1-propanesulfonate,
2-chloroethyl 3-(ethoxyphosphono)-1-butanesulfonate,
isopropyl 3-(isopropoxyphosphono)-1-propanesulfonate,
3-(di-n-butoxyphosphono)-1-propanesulfonic acid,
3-[bis(2-ethylhexoxy)phosphono]-1-propanesulfonic acid,
ethyl 4-(ethoxyphosphono)-2-methyl-1-pentanesulfonate,
2-butoxyethyl 3-[(2-butoxyethoxy)phosphono]-2-phenyl-1-propanesulfonate,
isopropyl 4-(isopropoxyphosphono)-1-decanesulfonate,
n-butyl 4-(phenoxyphosphono)-1-pentanesulfonate,
isopropyl 3-(isopropoxythionophosphono)-1-propanesulfonate, etc.

Examples of primary esters of phosphonoalkanesulfonic acid compounds provided by the present invention are:

methyl 3-phosphono-1-propanesulfonate,
2-butyloctyl 4-phosphono-1-pentanesulfonate,
2-chloroethyl 4-phosphono-2-propyl-1-tert-decanesulfonate,
2-(2-ethoxyethoxy)ethyl 3-phosphono-4,4-diphenyl-1-pentanesulfonate,
2-ethylhexyl 3-(thiophosphono)-1-propanesulfonate,
5-(nonoxyphosphono)-2,3-dimethyl-1-pentanesulfonic acid,
4-[2-(carbobutoxy)-ethoxyphosphono]-2-phenyl-1-butanesulfonic acid, etc.

The free acids in which all three ester groups have been replaced by hydrogen atoms which may be prepared by the process of this invention include, e.g.:

3-phosphono-1-propanesulfonic acid,
4-phosphono-1-butanesulfonic acid,
4-phosphono-1-pentanesulfonic acid,
5-phosphono-1-pentanesulfonic acid,
5-phosphono-2-pentanesulfonic acid,
2,2-dimethyl-3-phosphono-1-propanesulfonic acid,
3-phenyl-4-phosphono-1-butanesulfonic acid,
5,6-dimethyl-4-phosphono-1-heptanesulfonic acid,
3-methyl-4-phenyl-4-phosphono-1-butanesulfonic acid, etc.

Some corresponding examples derived from phosphinylalkanesulfonate compounds are:

ethyl 3-(ethylphosphinyl)-1-propanesulfonate,
3-(ethylphosphinyl)-1-propanesulfonic acid,
3-(ethylethoxyphosphinyl)-1-propanesulfonic acid,
3-(diethylphosphinyl)-1-propanesulfonic acid, etc.

In preparing the products of the invention, I prefer to operate substantially as follows:

For example, the tertiary phosphite ester (phosphonite or phosphinite) is contacted with the sultone at an elevated temperature until reaction is complete. Suitable temperatures may range from, e.g., 50° C. up to below the decomposition temperature of the reactants, and will vary with the nature of the reactants. While I have found that the reaction of the alkanesultone with the tertiary phosphite ester proceeds readily at atmospheric pressure, super- or subatmospheric pressures may be employed if desired, e.g., to raise or lower the reaction temperature. Catalysts, e.g., bases such as triphenylamine, may be used if desired, for example, to facilitate the reaction in the case of aryl esters. Solvents, such as benzene, hexane, dioxane, etc., are usually not required but may be included in the reaction mixture, e.g., to facilitate stirring. Generally, approximately equimolecular amounts of the sultone and the tertiary phosphite ester will be reacted together, but an excess of one of the components may be used if desired, since unreacted sultone or phosphite may readily be removed, e.g., by distillation, when the reaction is complete. Either the sultone and the phosphite ester may be mixed and then, if necessary, heat applied, or one of the reactants may be added gradually to the other. I have found that reaction is generally complete within from a few minutes to several hours; as further described below, if heating of the reaction mixture is continued after reaction is complete, it is possible, at higher temperatures, to cause pyrolysis of the tertiary ester of the phosphonoalkanesulfonate and consequent formation of the lower esters and/or free tribasic acid. When formation of the tertiary ester of the phosphonoalkanesulfonic acid is complete, unreacted sultone and tertiary phosphite ester may be removed, e.g., by distillation, extraction, etc.; the phosphonoalkanesulfonic acid tertiary ester may then be purified if desired, e.g., by washing, chromatographing to remove acidic impurities, distilling, etc.

In preparing the lower, i.e., secondary and primary esters of the present phosphonoalkanesulfonic acid compounds, I may either purify and isolate the tertiary ester prepared as described above, or I may proceed directly to the formation of the lower esters by continued heating of the reaction mixture of phosphite ester and sultone beyond the point of formation of the tertiary phosphonoalkanesulfonate ester. The latter tertiary ester may be pyrolyzed at elevated temperature, i.e., at temperatures, for example, which are 10° to 50° C. above their temperatures of formation, eliminating the ester group in the form of an olefin, and giving phosphonoalkanesulfonic acid compounds in which at least one of the three acid functions is present in the form of a free —OH group. Alternatively, I may prepare phosphonoalkanesulfonic acid compounds containing free acid groups from the tertiary ester of the corresponding phosphonoalkanesulfonic acid, prepared as described above, by applying to it any of the conventional means of hydrolyzing an ester to a free acid, i.e., treatment with a mineral acid such as hydrochloric acid, etc.

The invention is further illustrated, but not limited, by the following examples:

EXAMPLE 1

*Ethyl 3-(diethoxyphosphono)-1-propanesulfonate*

To a flask containing 16.6 grams (0.1 mole) of triethyl phosphite were added gradually, over a period of about 30 minutes, 12.2 grams (0.1 mole) of γ-propanesultone, while the temperature of the mixture was maintained at 155–165° C. After removal of low-boiling material, there remained 20.8 grams of the reaction product in the form of a light yellow, water-soluble oil. On distillation of an 8.7 gram portion of this product, 6.69 grams (56 percent yield) of ethyl 3-(diethoxyphosphono)-1-propanesulfonate ester was collected at 165–171° C./0.4 mm. The ester analyzed as follows:

|  | Found | Calculated for $C_9H_{21}O_6PS$ |
|---|---|---|
| Percent C | 36.42 | 37.5 |
| Percent H | 7.17 | 7.33 |
| Percent S | 11.19 | 11.11 |
| Percent P | 9.95 | 10.14 |

EXAMPLE 2

*The mono- and diisopropyl esters of 3-phosphono-1-propanesulfonic acid*

A mixture of 41.6 grams (0.22 mole) of triisopropyl phosphite and 24.4 grams (0.20 mole) of γ-propanesultone was placed in a flask equipped with a condenser and a cooled trap and heated. At 125° C. internal temperature, the reaction became exothermic. The mixture was stirred; the temperature slowly rose to 144° C. and then fell after about 10 minutes. After heating at 130° C. for half an hour, some three grams of propylene had been collected in the condenser trap; the triester had been pyrolyzed into the mono- and di-esters. To recover the latter, the reaction mixture was distilled at 5 mm. of mercury up to a pot temperature of 135° C., giving 13 grams of faintly amber distillate. The residue was dissolved in 200 ml. of ether, treated with charcoal and filtered. The filtrate was diluted with ether until a layer separated; the ether layer was decanted; and the residual oil was washed with ether and dried, giving 2.55 grams of the diisopropyl ester of 3-phosphono-1-propanesulfonic acid, which dissolves in water to give a strongly acidic solution, and analyzes as follows:

|  | Found | Calculated for $C_9H_{21}O_6PS$ |
|---|---|---|
| Percent C | 34.94 | 37.5 |
| Percent H | 7.22 | 7.52 |

The ether layer, after separation of the diester as described above, was evaporated under a slight vacuum at 120° C., giving 29.0 grams of the viscous, acidic, water-soluble monoisopropyl ester of 3-phosphono-1-propanesulfonic acid, which was found by analysis to contain 25.10 percent carbon.

EXAMPLE 3

*n-Butyl 3-(di-n-butoxyphosphono)-1-propanesulfonate*

A mixture of 40.0 grams of tri-n-butyl phosphite and 18.3 grams of γ-propanesultone was stirred at 150–165° C. for an hour. After removal of unreacted starting materials, there remained 32.8 grams of n-butyl 3-(di-n-butoxyphosphono)-1-propanesulfonate, which is a pale yellow, mobile oil, ($n_D^{25}$ 1.4515), insoluble in water, and soluble in ether and benzene. It analyzed as follows:

|  | Found | Calculated for $C_{15}H_{33}O_6PS$ |
|---|---|---|
| Percent C | 47.10 | 48.3 |
| Percent H | 8.91 | 8.92 |

EXAMPLE 4

*2-ethylhexyl 3-[bis(2-ethylhexoxy)phosphono]-1-propanesulfonate*

A mixture of 46.2 grams (0.11 mole) of tris(2-ethylhexyl) phosphite and 12.2 grams (0.10 mole) of γ-propanesultone was stirred while the temperature of the mixture was raised and held at 175 to 180° C. for 40 minutes. After removal of unchanged sultone and phosphite, there remained 38.8 grams of acidic (pH 2) residue, which was dissolved in benzene and passed through alumina, purifying it to give a water-insoluble, neutral material; the benzene was removed by evaporation, leaving 18.0 grams of the desired 2-ethylhexyl 3-[bis(2-ethylhexoxy)phosphono]-1-propanesulfonate, a faintly yellow oil:

|  | Found | Calculated for $C_{27}H_{57}O_6PS$ |
|---|---|---|
| Percent C | 59.52 | 59.9 |
| Percent H | 10.70 | 10.63 |

EXAMPLE 5

2-chloroethyl 3-[bis(2-chloroethoxy)phosphono]-1-propanesulfonate

A mixture of 40.4 grams (0.15 mole) of tris(2-chloroethyl) phosphite and 19.5 grams (0.16 mole) of γ-propanesultone was stirred at about 140–155° C. for two and a half hours. The reaction product was stirred with water, diluted with benzene, and decanted, washed with water, dried with sodium sulfate, and passed over alumina (to remove acidic materials). After removal of solvent by distillation at 100° C., there remained 53.1 grams of residual colorless 2-chloroethyl 3-[bis(2-chloroethoxy)phosphono]-1-propanesulfonate, soluble in ether, hexane and benzene, insoluble in water, and analyzing as follows:

|  | Found | Calculated for $C_9H_{18}O_6Cl_3PS$ |
|---|---|---|
| Percent C | 27.53 | 27.6 |
| Percent H | 4.66 | 4.63 |
| Percent Cl | 24.46 | 27.2 |

EXAMPLE 6

Preparation of ethyl 3-(ethoxyphenylphosphinyl)-1-propanesulfonate

To a flask containing 21.8 g. (0.11 mole) of diethyl phenylphosphonite at 120° C., 12.2 g. (0.10 mole) of γ-propanesultone in 10 ml. of benzene was gradually added, drop by drop. Then the temperature of the mixture was raised to 125–135° C., whereupon exothermic reaction began. This temperature range was maintained for about 40 minutes, after which the benzene was removed from the reaction mixture under a low vacuum. A 25 g. portion of the residue was distilled to remove unreacted starting material at up to 170° C., 8.5 g. being collected up to this temperature. The viscous, almost colorless residue from the distillation represented crude ethyl 3-(ethoxyphenylphosphinyl)-1-propanesulfonate; it weighed 16.0 and, after purification by passage over alumina, was found to contain 8.07% phosphorus ($C_{13}H_{21}O_5PS$ requires 9.67% P). Ethyl 3-(ethoxyphenylphosphinyl)-1-propanesulfonate is toxic on contact to the large milkweed bug, *Oncopeltus fasciatus*, at a concentration of 1% in acetone solution; it is toxic on contact to mosquito larvae, in 0.001% aqueous solution, and it possesses a stomach poison toxicity to *Aphis gossypii*.

Similarly, by the procedure as described above, the reaction of ethyl diisobutylphosphinite with δ-butanesultone gives ethyl 4-(diisobutylphosphinyl)-1-butanesulfonate; the reaction of diethyl p-chlorophenylphosphonite with γ-propanesultone gives ethyl 3-[(p-chlorophenyl)ethoxyphosphinyl]-1-propanesulfonate, etc.

EXAMPLE 7

For evaluation of microbiological toxicity, 1% solutions of each of the products of Examples 1, 3 and 5 were prepared by dissolving 100 mg. samples of the compounds in 10 ml. of acetone. A mixture of 2 ml. of the solution of the test compound with 18 ml. of sterile nutrient agar was poured into a sterile Petri dish and allowed to harden. The plates prepared in this way were each inoculated with a drop of a stock culture of *Micrococcus pyogenes* var. *aureus* on one side, and a drop of a culture of *Salmonella typhosa* on the other side of the plate, and then incubated 5 days at 25° C. It was found that the growth of *S. typhosa* was inhibited by each of the three compounds tested, while *M. pyogenes* failed to grow on the plates containing either the product of Example 1 or the product of Example 3.

The present esters can be employed to prevent or retard bacterial attack on leather, cotton, wood, plants, starches, and other organic material. These products of the invention need be employed only in minor amounts to obtain the benefits of their physiologic activity against pathogenic agents such as bacteria, and may be admixed, if desired, with inert carriers to facilitate their application to potential pathogen hosts in minimum bactericidal and bacteriostatic amounts.

The present esters are also active miticides. Each of the products of Examples 1–5, above, was toxic to *Tetranychus telarius* (the two-spotted spider mite), when leaves infested with this organism were dipped in 0.1% aqueous emulsion of the compounds. (Emulsifier L, which is reputed to be a polyalkylene glycol derivative of an alkylbenzenesulfonate, was used as the emulsifying agent in these tests.) The esters were found to possess both immediate toxicity, to adult stages, and residual activity (after seven days) towards resting stages and eggs of the mites. Also susceptible to poisoning by the present sulfonates are other aphid species, such as cotton aphids (*Aphis gossypii*). The present esters wherein each acid function is esterified by a chlorine-substituted alkyl radical are also toxic to the growth stages of true insects (Hexapoda), such as the Mexican bean beetle (*Epilachna verivestis*) larvae, yellow fever mosquito (*Aedes aegypti*) larvae, etc. The esters of the invention may be applied to insect and mite habitats either directly, in the form of the oily to solid products obtained as described above, or diluted with insecticide adjuvants, e.g., forming sprayable toxicants such as the emulsion described above.

The phosphorus compounds of the invention are additionally active as herbicides. Applied to plants as the active herbicidal ingredient of a foilage spray, the products of the invention are phytotoxic to broadleaf plants, and also exhibit some toxicity to grasses. For example, an aluminum pan containing 10–20 two-week old seedlings each of radish, buckwheat, red clover, and sugar beet was sprayed with 15 cc. of an 0.5% aqueous emulsion (prepared with Emulsifier L) of n-butyl 3-(di-n-butoxyphosphinyl)-1-propanesulfonate; this rate equalling about 9 lbs./acre. After two weeks, the pan was observed; all of the seedlings of these four plant species were dead. Each of the other products of the above examples similarly produced had marked phytotoxic symptoms, such as chlorosis, leaf curl, etc., when applied to plants as a foilage spray.

For use as toxicants, the products of the invention can be dispersed on a finely divided solid and employed as a dust. Also, such mixtures can be dispersed in water with the aid of a wetting agent, and the resulting aqueous dispersions applied to pest habitations as sprays. In other procedures, the products can be employed in oils, i.e., water-immiscible organic solvents, as constituents of oil-in-water emulsions, or in water dispersions, with or without the addition of wetting, dispersing, or emulsifying agents. Suitable emulsifying agents are the polyalkylene glycol alkylbenzenesulfonate derivative listed above, and similar agricultural emulsifying adjuvants, such as are listed, e.g., in U.S. Dept. of Agriculture Bulletin E607. The amount of the present esters employed in pesticidal compositions containing inert carriers will vary with the ester utilized, the manner of application, the organism which it is sought to inhibit or kill, etc., and will be adjusted accordingly, the examples given above indicating representative concentrations for toxicity against various organisms.

The new esters and acids of the invention are stable compounds which range from oils to semi-solid materials, which are generally soluble in organic solvents. They are biological toxicants and are useful as insecticides. The novel compounds afforded by the present reaction may also be used as components of agricultural pesticide compositions, such as fungicides, bactericides, miticides, nematocides, herbicides, etc. The long-chain alkyl esters, i.e., those containing ester groups of from 6 to 12 carbon atoms, particularly the alkyl esters, may be used, for example, as surface-active agents and as plasticizers.

Short-chain esters of the present formula may be applied as bacteriostats, e.g., in soap. The present compounds can also be utilized as chemical intermediates, e.g., for conversion to the corresponding sulfonate metal salts, which may be used as oil additives.

What is claimed is:

1. The method which comprises heating above 50° C. an organophosphorus acid compound selected from the class consisting of $(RA)_3P$, $(RA)_2R_1P$ and $(RA)(R_1)_2P$ wherein R is an alkyl radical having from 1 to 12 carbon atoms, $R_1$ is a hydrocarbon radical free of non-benzenoid unsaturation having from 1 to 12 carbon atoms and A is a chalcogen element selected from the class consisting of oxygen and sulfur, with an alkane sultone selected from the class consisting of γ and δ sultones of the formula

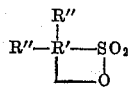

wherein R' is a straight-chain saturated aliphatic hydrocarbon radical of 3 to 4 carbon atoms, and R" is selected from the class consisting of hydrogen and lower alkyl radicals, and isolating from the resulting product a compound of the formula

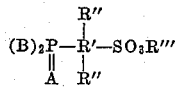

wherein R''' is selected from the class consisting of hydrogen and R and B is selected from the class consisting of $R_1$ and AR'''.

2. The process which comprises reacting propanesultone with a lower dialkyl ester of phenylphosphonous acid, and isolating from the resulting reaction product a lower alkyl ester of 3-[(lower alkoxy)(phenyl)phosphinyl]-1-propane sulfonic acid.

3. The process which comprises reacting propanesultone with diethyl phenylphosphonite and isolating from the resulting reaction product ethyl 3-[(ethoxy)phenylphosphinyl]-1-propanesulfonate.

4. The method which comprises heating together at above 50° a trialkyl phosphite ester of the formula $(Alk-O)_3P$, wherein Alk is an alkyl radical of from 1 to 16 carbon atoms with propanesultone of the formula

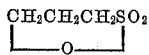

and isolating from the resulting reaction product the corresponding alkyl 3-(dialkoxyphosphono)-1-propanesulfonate.

5. The method which comprises heating together at above 100° C. approximately equimolar amounts of triethyl phosphite and γ-propanesultone and isolating from the resulting reaction product ethyl 3-(diethoxyphosphono)-1-propanesulfonate.

6. The method which comprises heating together at above 50° C. approximately equimolar amounts of triisopropyl phosphite and γ-propanesultone and recovering from the resulting reaction product an isopropyl ester of 3-phosphono-1-propane-sulfonic acid.

7. The method which comprises heating together at above 100° C. approximately equimolar amounts of tri-n-butyl phosphite and γ-propanesultone and isolating from the resulting reaction product n-butyl 3-(di-n-butoxyphosphono)-1-propanesulfonate.

8. The method which comprises heating together at above 150° C. approximately equimolar amounts of tris-(2-ethylhexyl) phosphite and γ-propanesultone and isolating from the resulting reaction product 2-ethylhexyl 3-[bis(2-ethylhexoxy)-phosphono]-1-propanesulfonate.

9. The method which comprises heating together at above 50° C. approximately equimolar amounts of tris-(2-chloroethyl) phosphite and γ-propanesultone and recovering from the reaction product 2-chloroethyl 3-[bis(2-chloroethoxy)phosphono]-1-propanesulfonate.

10. A compound of the formula

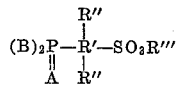

wherein R''' is selected from the class consisting of hydrogen and alkyl radicals having from 1 to 12 carbon atoms, A is a chalcogen element selected from the class consisting of oxygen and sulfur, R' is a straight-chain saturated aliphatic hydrocarbon radical of from 3 to 4 carbon atoms providing for the joining of the phosphorus and sulfur atoms by 3 and 4 carbon atom chains, R" is selected from the class consisting of hydrogen and lower alkyl radicals, and B is selected from the class consisting of hydrocarbon radicals free of non-benzenoid unsaturation having from 1 to 12 carbon atoms and AR'''.

11. An isopropyl ester of 3-phosphono-1-propanesulfonic acid.

12. Lower alkyl esters of 3-[(lower alkoxy)(phenyl)-phosphinyl]-1-propanesulfonic acids.

13. Ethyl 3-[(ethoxy)(phenyl)phosphinyl]-1-propanesulfonate.

14. An ester of the formula

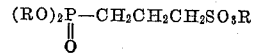

wherein R is an alkyl radical having from 1 to 16 carbon atoms.

15. Ethyl 3-(diethoxyphosphono)-1-propanesulfonate.

16. n-Butyl 3-(di-n-butoxyphosphono)-1-propanesulfonate.

17. 2-ethylhexyl 3-[bis(2-ethylhexoxy)phosphono]-1-propanesulfonate.

18. 2-chloroethyl 3-[bis(2-chloroethoxy)phosphono]-1-propanesulfonate.

References Cited in the file of this patent

FOREIGN PATENTS 938,186   Great Britain _____ Jan. 26, 1956

UNITED STATES PATENT OFFICE
CERTIFICATE OF CORRECTION

Patent No. 2,957,905 October 25, 1960

Van R. Gaertner

It is hereby certified that error appears in the above numbered patent requiring correction and that the said Letters Patent should read as corrected below.

Column 1, line 41, for "alkanesulton eis" read -- alkanesultone is --; lines 48 to 54, the right-hand portion of the formula should appear as shown below instead of as in the patent:

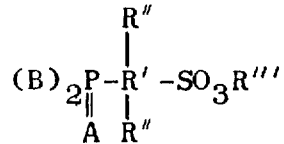

column 2, line 39, for "acid, the sultone of 5-hydroxy-1-pentanesulfonic acid," read -- the sultone of 5-hydroxy-4-methyl-1-hexanesulfonic acid, --; line 56, for "groups" read -- group --; column 5, line 38, for "3-[(diisopropylphenyl)-ethoxyphosphinyl)]-" read -- 3-[(diisopropylphenyl)ethoxyphosphinyl]- --.

Signed and sealed this 1st day of January 1963.

(SEAL)
Attest:

ERNEST W. SWIDER
Attesting Officer

DAVID L. LADD
Commissioner of Patents